Oct. 15, 1935.    J. H. BRADY    2,017,036

AUTOMATIC BOTTLE CAP

Filed Sept. 27, 1933

Inventor
James Henry Brady
By E. W. Anderson Jon.
Attorney

Patented Oct. 15, 1935

2,017,036

UNITED STATES PATENT OFFICE 2,017,036

AUTOMATIC BOTTLE CAP

James Henry Brady, Louisville, Ky.

Application September 27, 1933, Serial No. 691,224

4 Claims. (Cl. 215—37)

The invention has relation to bottle caps which are normally closed and are adapted to automatically open on tilting a bottle or jar to pour out the contents thereof and to automatically close again on righting the bottle, an object being to provide an improved cap of this description designed to facilitate the automatic opening thereof and to form a secure closure against entrance of air and other contaminating influences and also against escape of gas in the case of carbonated beverages. Another object is to provide an improved device for adding to the convenience of the user in pouring liquids from a container without necessity of removing the cap; such liquids for instance as ice water, milk and fruit and vegetable juices. Other objects and advantages will hereinafter appear.

The invention consists in the novel construction and combinations of parts as set forth in the appended claims.

In the accompanying drawing illustrating certain embodiments of the invention,

Figure 1:
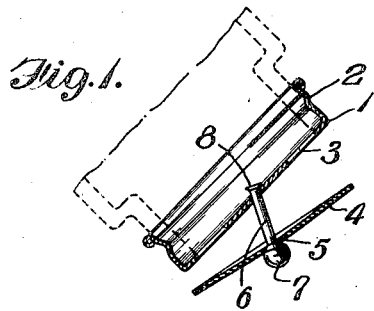
Figure 1 is a central cross section of the cap with parts thereof in the positions assumed when the bottle is tilted.
Figure 4:
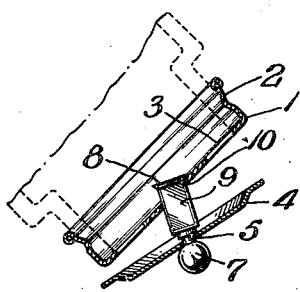
Figure 2:
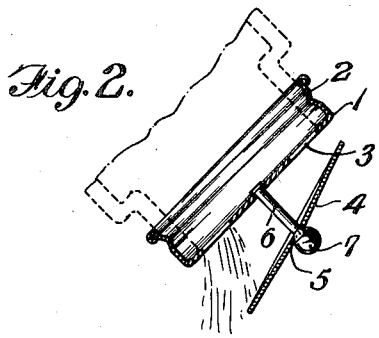
Figure 2 is a similar view with the parts in the positions assumed during discharge of the bottle contents.
Figure 5:
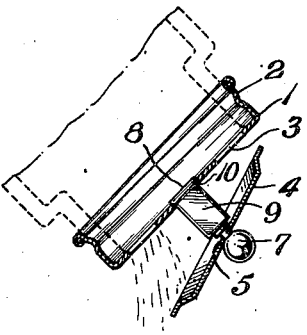
Figure 3:
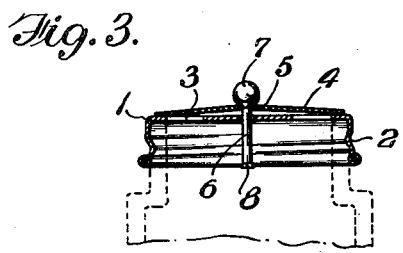
Figure 3 is a similar view with the bottle righted and the parts in normal position with the cap closed against entrance of air, etc.
Figure 6:
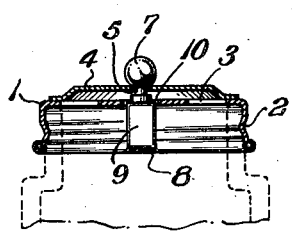

Figures 4, 5, and 6 are views similar to Figures 1, 2, and 3 and showing a modification.

Figure 7:
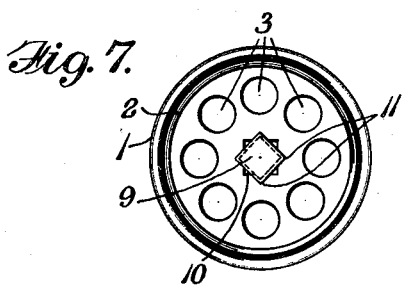

Figure 7 is a bottom plan view of the modification with the pin rotated to hold the disk securely in closed position.

Figure 8:
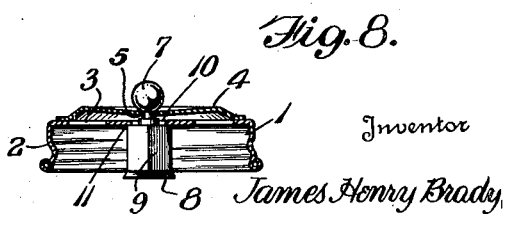

Figure 8 is a view similar to Figure 6 with the pin rotated to hold the disk securely in closed position.

In the drawing, the numeral 1, designates a cover for the open mouth of a bottle, and having a marginal screw flange 2, for detachable engagement with the bottle neck and a plurality of perforations 3 including a central perforation.

A disk 4, has a central perforation 5, being otherwise imperforate and adapted to rest upon said cover to close the perforations thereof with the exception of the central perforation, a pin 6 loosely and slidably engaging the central perforations of both cover and disk, said disk being tiltable on said pin, the latter being tiltable with respect to said cover, said disk being bodily movable away from said cover along with said pin, the latter being movable substantially entirely without said cover and having an upset lower end 8, engaging said cover to limit the movement, said pin having a weighted ball upper end 7, normally engaging the perforation of said disk to close the same.

In operation, the bottle being tilted as in Figure 1, the pin, due to its weighted ball upper end 7 and its loose seat in the central perforation of said cover, will tilt downwardly in said seat with respect to said cover and move outwardly without said cover for substantially its entire length, said disk being movable along with the pin to fully open position.

In the discharge of the contents of the bottle, the flow of such contents upon the lower edge of said disk will cause tilting of the disk upon the shaft of the pin, as shown in Figure 2, thereby facilitating such discharge.

In the modified form shown in Figures 4 to 8 inclusive, the same reference characters are used, the shaft 9 of the pin being of polygonal form in cross section, and the central perforation 10 of the cover being also of polygonal form.

In this modification, the upper end portion of the shaft 9 of the pin is provided with shoulders 11, said upper portion normally engaging the perforation 10 of said cover to prevent rotation of the pin, the disk 4 being elastically deformable on depression of the pin, as shown in Figure 8, to bring said shoulders in the plane of the lower surface of the cover and render the pin rotatable, said shoulders being engagable with the lower surface of the cover on rotation of the pin against the tension of said disk to hold the latter securely in closed position.

I claim:

1. In a bottle cap, a cover for the open mouth of a bottle, provided with a flanged rim adapted for detachable engagement with the neck of the bottle and having a plurality of perforations including a central perforation, a disk having a central perforation and being otherwise imperforate and adapted to rest on said cover to close the perforations thereof with the exception of the central perforation, and a pin engaging the central perforations of both said cover and said disk, the latter being tiltable on said pin; said pin having loose slidable engagement with the central perforation of and being tiltable with respect to said cover, said disk being bodily movable away from said cover along with said pin, and said pin having an upset lower extremity engaging said cover to limit the movement and having a weighted enlarged upper end normally engaging the perforation of said disk to close the same.

2. In a bottle cap, a cover for the open mouth of a bottle, provided with a flanged rim adapted for detachable engagement with the neck of the bottle and having a plurality of perforations including a central perforation, a disk having a central perforation and being otherwise imperforate and adapted to rest on said cover to close the perforations thereof with the exception of said central perforation, and a pin engaging the central perforations of said cover and said disk, the latter being tiltable on said pin; said pin having loose slidable engagement with the central perforation of and being tiltable with respect to said cover, said disk being bodily movable away from said cover along with said pin, said pin having an upset lower extremity engaging the cover to limit the movement and a weighted enlarged upper end normally engaging the perforation of said disk to close the same, said pin having a shaft provided with upper shoulders engageable with the lower surface of said cover on rotation of the pin to hold the disk in closed position.

3. In a bottle cap, a cover for the open mouth of a bottle, provided with a flanged rim adapted for detachable engagement with the neck of the bottle and having a plurality of perforations including a central perforation, a disk having a central perforation and being otherwise imperforate and adapted to rest on said cover to close the perforations thereof with exception of the central perforation, and a pin engaging the central perforations of said cover and said disk, the latter being tiltable on said pin; said pin having loose slidable engagement with the central perforation of and being tiltable with respect to said cover, said disk being bodily movable away from said cover along with said pin, said pin having an upset lower extremity engaging said cover to limit the movement and a weighted enlarged upper end normally engaging the perforation of said disk to close the same, said pin having a shaft provided with upper shoulders, said disk being elastically deformable upon depression of said pin to bring said shoulders in the plane of the lower surface of said cover, said shoulders being engageable with the lower surface of the cover on rotation of said pin against the tension of said disk to hold the latter securely in closed position.

4. In a bottle cap, a cover for the open mouth of a bottle, provided with a flanged rim adapted for detachable engagement with the neck of the bottle and having a plurality of perforations including a central perforation, a disk having a central perforation and being otherwise imperforate and adapted to rest on said cover to close the perforations thereof excepting said central perforation, and a pin engaging the central perforations of said cover and said disk, the latter being tiltable on said pin; said pin having loose slidable engagement with the central perforation of and being tiltable with respect to said cover, said disk being bodily movable away from said cover along with said pin, said pin having an upset lower extremity engaging said cover to limit the movement and a weighted ball upper end normally engaging the perforation of said disk to close the same, said pin having a shaft of polygonal form in cross section provided with upper shoulders, the central perforation of said cover being also of polygonal form, said disk being elastically deformable on depression of said pin to bring said shoulders in the plane of the lower surface of said cover, said shoulders being engageable with the lower surface of the cover on rotation of the pin against tension of said disk to hold the latter securely in closed position.

JAMES HENRY BRADY.